Patented Oct. 22, 1940

2,218,952

UNITED STATES PATENT OFFICE 2,218,952

AMIDELIKE DERIVATIVES OF DYESTUFFS AND PROCESS OF MAKING SAME

Charles Graenacher, Riehen, and Joseph Gyr and Otto Kaiser, Basel, and Franz Ackermann, Binningen, and Heinrich Bruengger, Basel, Switzerland, assignors to the firm of Society of Chemical Industry in Basle, Basel, Switzerland No Drawing. Application December 7, 1937, Serial No. 178,612. In Switzerland December 16, 1936

10 Claims. (Cl. 260—173)

It has been found that dyestuffs which contain at least one amino group united directly to an aromatic nucleus whose ring system consists of not more than 10 carbon atoms, and which amino group carries at least one hydrogen atom linked to the nitrogen atom, can be transformed into new conversion products which are characterized by solubility, by treating the said dyestuffs with such acylating agents which are derived from organic acids containing more than one salt forming group, which group itself is selected from the group consisting of carboxyl groups and sulfonic groups.

The dyestuffs serving as parent materials may belong to various classes provided that they fulfil the conditions stated in the preceding paragraph. Thus, there may be used mono-, dis- or poly-azo-dyestuffs, further also other dyestuffs, such as for instance dyestuffs of the anthraquinone, triphenylmethane, azine, nitro or other series. These dyestuffs may be used as such or in the form of complex metal compounds, for instance in the form of chromium, copper, iron, nickel or cobalt complexes.

Acylating agents deriving from organic acids which contain more than one salt-forming group selected itself from the group consisting of carboxyl groups and sulfonic groups, are for example halides of aliphatic, hydroaromatic or aromatic carboxylic acids which contain sulfonic groups or carboxyl groups. These groups can be transformed after the action of the acylating agents on the dye into water-soluble metal salts or ammonium salts. As examples of acylating agents deriving from organic acids which contain more than one salt-forming group selected itself from the group consisting of carboxyl groups and sulfonic groups, there may be mentioned halides of polycarboxylic acids, such as for example benzene-1:3:5-tricarboxylic acid, benzene hexacarboxylic acid, and polysulfonic acids, such as for example 1:3-benzene-disulfonic acid, 1:3:6-naphthalenetrisulfonic acid; further there are quite particularly suitable halides of sulfo-carboxylic acids in which both the sulfonic group and the carboxyl group are in the form of their halides, and those in which only the sulfonic groups or only the carboxyl groups are in the form of their halides. Examples of such compounds are the halides of the sulfobenzoic acids, of the sulfonaphthoic acids, of the sulfo-acid, and the like.

The acylation can be carried out by the usual methods, such as by heating the dyestuffs with the acylating agents with or without the addition of agents which bind acid, or preferably in the presence of tertiary bases which form no stable reaction products with acylating agents, i. e. contain neither OH nor primary or secondary amino groups nor other groups capable of being acylated, particularly pyridine, or also indifferent solvents. For carrying out the reaction the halides of the above mentioned acids or the analogues thereof need not be isolated. On the contrary, the reaction product of a phosphorous halide, such as for example phosphorous trichloride or pentachloride, on the corresponding acids may be used directly. One may also proceed in such a manner that a solution of the dyestuff containing amino groups and the polyvalent acid is treated in the tertiary base with phosphorous pentachloride or phosphorous trichloride.

The products of the invention are characterized, as already stated, by their solubility. The process permits the conversion of insoluble or sparingly soluble dyestuffs into products which are soluble in water and can be used for dyeing in the manner of acid dyestuffs for dyeing or printing animal fibers or in the manner of direct dyeing dyestuffs for dyeing vegetable fibres, or for dyeing artificial textiles from regenerated cellulose in a neutral or feebly alkaline bath, or for dyeing leather or the like. If the parent material contains besides the reactive NH-group one or more hydroxy groups, these latter may also be acylated during the acylation process. These acyl groups are so loosely united, however, that they are eliminated by action of mild saponifying agents, whereas the acyl residues attached to the NH-groups remain unattacked.

The products obtainable according to the present process represent therefore amidelike derivatives of dyestuffs of the general formula

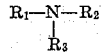

in which $R_1$ stands for the radical of a dyestuff which contains at least one amino group united directly to an aromatic nucleus whose ring system consists of not more than 10 carbon atoms, which amino group carries at least one hydrogen atom linked to the nitrogen atom, $R_2$ stands for an acyl radical which contains at least one salt forming group selected from the groups consisting of carboxyl and sulfonic groups, and $R_3$ stands for a radical selected from the group consisting of hydrogen and alkyl, which products are water-soluble powders and valuable water-soluble dyestuffs. Among these dyestuffs those are particularly important wherein $R_3$ stands for hydrogen and wherein the radical $R_1$ stands for an azo-dyestuff free from hydroxyl groups and having more than one azo-group. Such products are for example those corresponding to the following formulas:

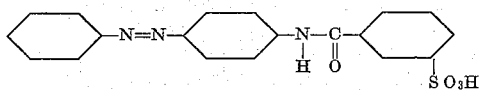

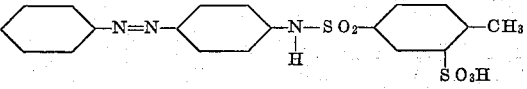

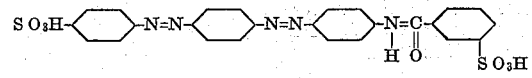

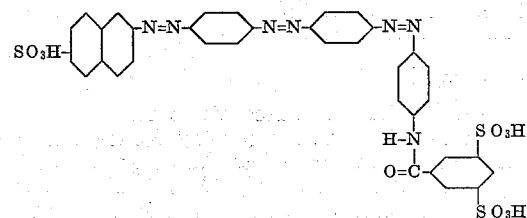

Among these products those are again particularly valuable which are derived from the linear trisazo-dyestuffs. They are dark powders and dye the fiber yellow to orange and brown tints capable of discharge, which are characterized by their fastness to light.

The following examples illustrate the invention, the parts being by weight:

*Example 1*

11.2 parts of amino-azo-toluene, 100 parts of pyridine and 20.7 parts of toluene-2:4-disulfochloride are heated together for 2 hours at 80–90° C. until a sample dissolves clearly in water.

The pyridine is then distilled as far as possible in a vacuum and the residue is dissolved in water and neutralized by means of dilute sodium carbonate solution. From the solution thus obtained the desired product is salted out with sodium chloride and is then filtered and dried. It is a brown-yellow powder soluble in water to a clear solution and dyes wool fast orange-yellow. The new dyestuff corresponds with the formula

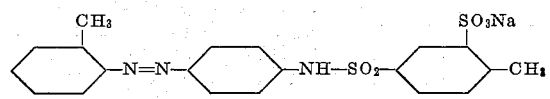

The dyestuff from 4 - methylamino - 3:2' - dimethyl-azobenzene behaves in similar manner and leads to a product of the formula

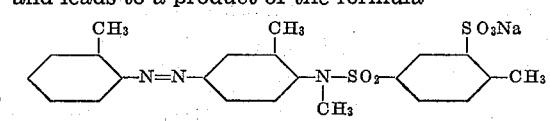

*Example 2*

To a mixture produced by the reaction of 16.4 parts of benzoic acid 3-sulfochloride with 100 parts of pyridine there are added 11.2 parts of amino-azo-toluene, and the whole is heated during one hour at 80–90° C. until a sample dissolves clearly in water.

Further working up is as described in Example 1. The substance which corresponds probably with the formula

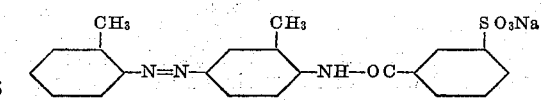

is a bright brownish powder soluble in water to a yellow solution. The same product is formed if instead of pyridine another tertiary base, for instance dimethylaniline or tripropylamine is used. The benzoic acid-sulfochloride can also be replaced by another sulfocarboxylic acid chloride, for example that of the furane carboxylic acid. The condensation product then corresponds with the formula

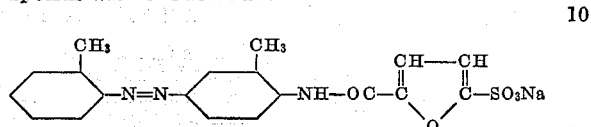

*Example 3*

6 parts of the amino-azo-dyestuff from diazotized 2-methoxy-1-aminobenzene and 1-amino-7-hydroxynaphthalene are dissolved in 85 parts of pyridine and the solution is mixed with 10 parts of benzoic acid 3:5-disulfochloride and then heated at 45–50° C. during one hour. 100 parts of water are now added, followed by 35 parts of saturated sodium carbonate solution, the pyridine is distilled with steam and the residue is extracted with 500 parts of boiling saturated sodium chloride solution. After cooling 20 parts of acetic acid of 40 per cent strength are added and the whole is filtered. The dyestuff on the filter of the probable formula

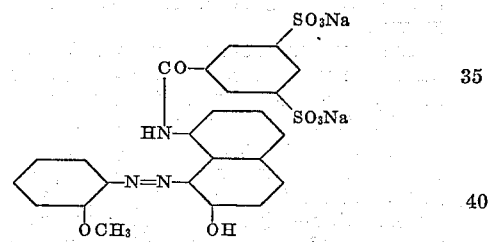

is washed with sodium chloride solution of 10 per cent strength. It dyes wool bluish-red tints.

*Example 4*

8 parts of the amino-azo-dyestuff from diazotized 2-methoxy-1-aminobenzene and 1-amino-7-hydroxynaphthalene are dissolved in 65 parts of pyridine and to the solution there are added 6 parts of toluene-disulfochloride, and the whole is stirred during one hour at 50–55° C. 100 parts of water are then added, followed by 25 parts of saturated sodium carbonate solution. 200 parts of a saturated solution of sodium chloride are added, and the pyridine is distilled with steam. The dyestuff of the formula

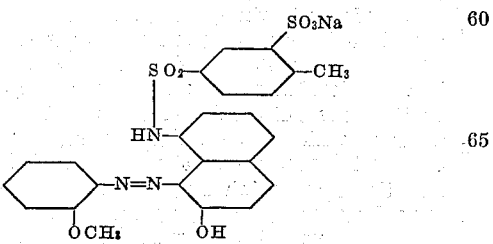

is quantitatively precipitated in crystalline form and is filtered and washed three times with sodium chloride solution of 6 per cent strength. When dry it is a dark red powder, the aqueous solution of which dyes wool bluish-red tints.

Example 5

6.3 parts of the amino-azo-dyestuff from diazotized 2-methyl-4-chloro-1-aminobenzene and 1-amino-7-hydroxynaphthalene are stirred together with 75 parts of pyridine and 8.5 parts of toluene-disulfochloride during one hour at 70–75° C. There are then added to the mixture 100 parts of water, 25 parts of saturated sodium carbonate solution and 170 parts of saturated sodium chloride solution. After distilling the pyridine with steam and filtering the residue, the dyestuff on the filter is washed twice with sodium chloride solution of 7 per cent strength and is then a red powder which corresponds with the formula

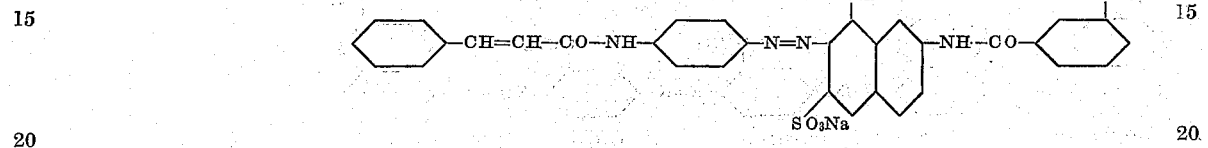

and dyes wool orange-red tints.

Example 6

19.3 parts of the acid coupling product from diazotized 1-amino-4-nitro-2-methylsulfone and 1-amino-5-hydroxynaphthalene are stirred together with 300 parts of pyridine. Into this mixture there are strewn 33 parts of benzoic acid meta-sulfochloride and the temperature is raised to 90° C. and maintained thereat until a sample

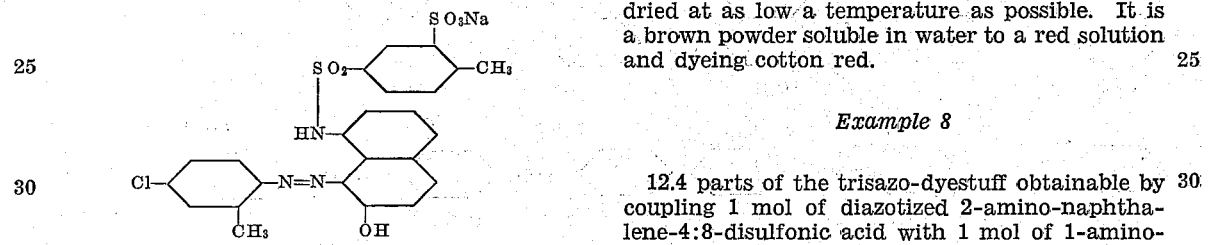

is soluble in water. The pyridine is distilled in a vacuum, the residue is taken up with water and the condensation product of the probable formula

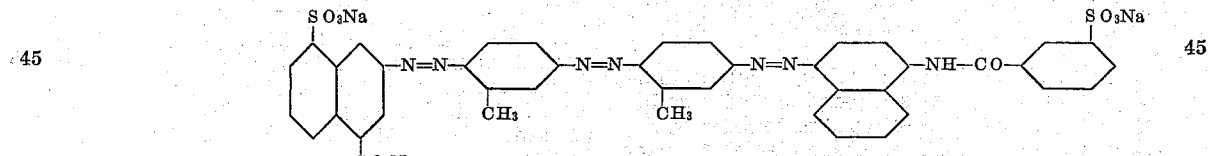

is salted out with sodium chloride and then dried. It is a brown powder soluble in water to a brown solution. In a sulfuric acid bath it dyes wool brown. After treatment of the dyeing in an aqueous ammoniacal solution of sodium chloride there is obtained a fast brown-violet tint.

Example 7

10 parts of the azo-dyestuff from diazotized 1-amino-4-cinnamoyl-aminobenzene and 2-amino-8-hydroxynaphthalene-6-sulfonic acid (alkaline coupling) are stirred with 17.6 parts of benzoic acid 3-sulfochloride and 100 parts of pyridine for 3–4 hours at 100° C. As soon as the sample becomes soluble in acidified water, the pyridine is distilled, the residue is dissolved in water, the solution is made alkaline with sodium carbonate and boiled for a short time and the dyestuff of the formula

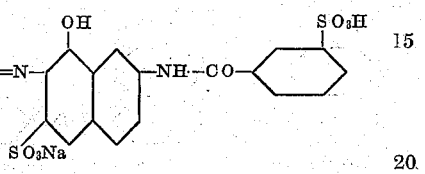

is precipitated by means of sodium chloride. The dyestuff is separated from the watery layer and dried at as low a temperature as possible. It is a brown powder soluble in water to a red solution and dyeing cotton red.

Example 8

12.4 parts of the trisazo-dyestuff obtainable by coupling 1 mol of diazotized 2-amino-naphthalene-4:8-disulfonic acid with 1 mol of 1-amino-3-methylbenzene, further diazotizing and coupling with 1 mol of 1-amino-3-methylbenzene, further diazotizing and coupling with 1 mol of 1-aminonaphthalene, 9 parts of benzoic acid 3-sulfochloride and 100 parts of pyridine are stirred together for about 2 hours at 90–100° C. As soon as the sample is soluble in acidified water, the pyridine is distilled in a vacuum, the residue is dissolved in water and the condensation product of the formula

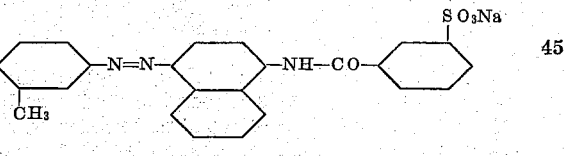

is precipitated by sodium chloride. When dry this product is a dark brown powder which dissolves in water to a brown solution in which cotton is dyed brown fast to light. The dyeings are characterized by their fastness to light and dischargeability. The reaction may also be carried out in another tertiary base which is free from hydroxyl groups or other groups capable of being acylated, for example in dimethylaniline, diethylaniline or triamylamine.

Products of similar properties are obtained if instead of the above dyestuff analogously constituted dyestuffs are used. As examples of such products there may be cited the following products

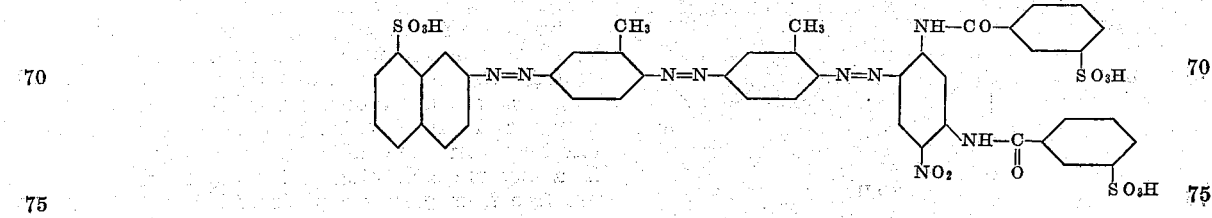

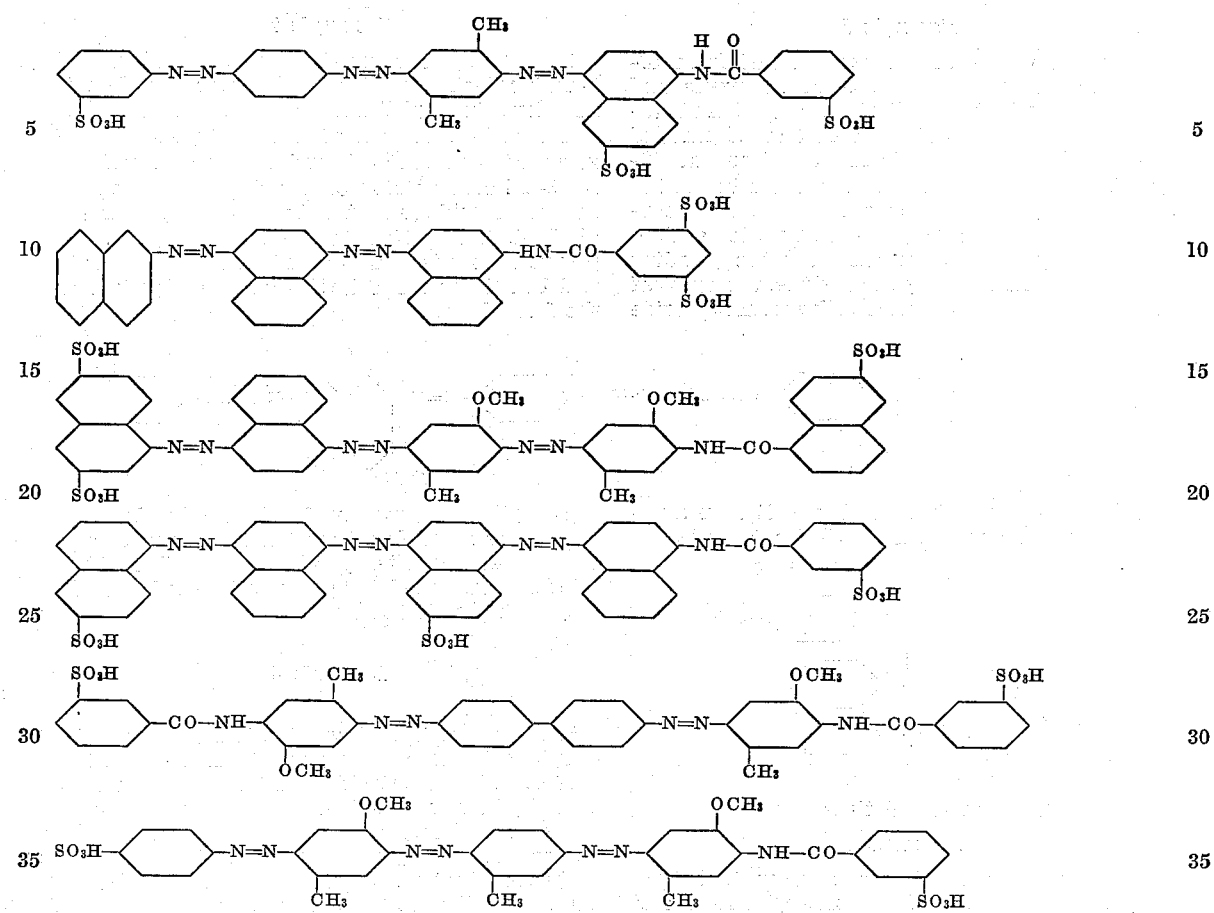

These products are dark powders dissolving in water to orange to brown solutions and dyeing cotton or artificial silk from regenerated cellulose orange to brown tints which are characterized by their fastness to light and dischargeability.

*Example 9*

21 parts of 1:4-di-(para-aminophenyl)-aminoanthraquinone, 66 parts of benzoic acid 3-sulfochloride and 300 parts of pyridine are stirred together at 90–100° C. until a sample of the mixture is soluble in acidified water. The pyridine is now distilled and the residue worked up as described in Example 7.

The dark powder thus obtained corresponds with the formula

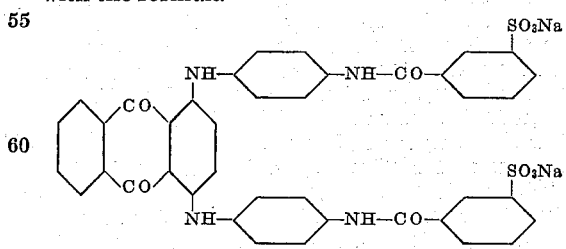

dissolves in water to a blue solution and dyes wool in an acid bath green-blue tints.

A brown-yellow dyestuff is the product of the formula

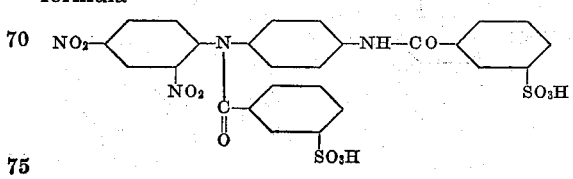

which is obtained by the action of sulfobenzoylchloride on the saponified condensation product from 1 mol dinitrochlorobenzene and 1 mol acetyl-para-phenyldiamine.

*Example 10*

A dyebath is prepared with 2 per cent of the dyestuff of Example 8 and 2 per cent of calcined sodium carbonate, cotton is entered at 60° C., the bath is heated to boiling and after ¼ hour 30 per cent of crystallized sodium sulfate are added and the whole is boiled for another half hour. The cotton is thereby dyed a brown fast to light.

*Example 11*

A dyebath is prepared with 2 per cent of the dyestuff of Example 7, viscose artificial silk is entered at 60° C., the temperature is raised to 80–90° C., and after ¼ hour crystallized sodium sulfate is added and dyeing is continued at the aforesaid temperature for a further ½ hour. The viscose artificial silk is dyed fast pink.

*Example 12*

Wool is dyed in the manner usual for dyestuffs that dye in acetic acid solution with 2 per cent of the dyestuff of Example 9. The wool is dyed fast green.

What we claim is:

1. Process for the manufacture of amidelike derivatives of dyestuffs, consisting in treating dyestuffs which contain at least one amino group united directly to an aromatic nucleus whose ring system consists of not more than 10 carbon atoms, and which amino group carries at least one hydrogen atom linked to the nitrogen atom, in a medium consisting of tertiary bases which are free from groups capable of being acylated, with acylating agents which are derived from such organic acids which contain more than one salt forming group selected from the group consisting of carboxyl and sulfonic groups.

2. Process for the manufacture of amidelike derivatives of dyestuffs, consisting in treating dyestuffs which contain at least one amino group united directly to an aromatic nucleus whose ring system consists of not more than 10 carbon atoms, and which amino group carries at least one hydrogen atom linked to the nitrogen atom, in a medium consisting of tertiary bases which are free from groups capable of being acylated, with halides of such organic acids which contain more than one salt forming group selected from the group consisting of carboxyl and sulfonic groups.

3. Process for the manufacture of amidelike derivatives of azo-dyestuffs consisting in treating azo-dyestuffs which contain at least one amino group united directly to an aromatic nucleus whose ring system consists of not more than 10 carbon atoms, and which amino group carries at least one hydrogen atom linked to the nitrogen atom, in a medium consisting of tertiary bases which are free from groups capable of being acylated, with halides of such organic acids which contain more than one salt forming group selected from the group consisting of carboxyl and sulfonic groups.

4. Process for the manufacture of amidelike derivatives of azo-dyestuffs, consisting in treating amino-azo-dyestuffs which are free from hydroxyl groups, contain more than one azo-group and at least one primary amino group united to an aromatic nucleus whose ring system consists of not more than 10 carbon atoms, in a medium consisting of tertiary bases which are free from groups capable of being acylated, with halides of such organic acids, which contain more than one salt forming group selected from the group consisting of carboxyl and sulfonic groups.

5. Process for the manufacture of amidelike derivatives of azo-dyestuffs, consisting in treating amino-azo-dyestuffs which are free from hydroxyl groups, contain more than one azo-group and at least one primary amino group united to an aromatic nucleus whose ring system consists of not more than 10 carbon atoms, in a medium consisting of pyridine with halides of such sulfonic acids of benzoic acid which contain at least one and not more than two sulfonic acid groups.

6. Process for the manufacture of amidelike derivatives of azo-dyestuffs, consisting in treating linear mono-amino-trisazo-dyestuffs which are free from hydroxyl groups, contain at least one sulfonic group and at least one primary amino group united to an aromatic nucleus whose ring system consists of not more than 10 carbon atoms, in a medium consisting of pyridine, with halides of such sulfonic acids of benzoic acid which contain at least one and not more than two sulfonic acid groups.

7. The amidelike derivatives of dyestuffs free from hydroxyl groups, which derivatives correspond to the formula

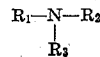

in which $R_1$ represents the radical of a dyestuff which is free from hydroxyl groups and carries at least one amino group united directly to an aromatic nucleus whose ring system consists of not more than 10 carbon atoms, and which amino group carries itself at least one hydrogen atom linked to the nitrogen atom, $R_2$ represents a radical of a cyclic carboxylic acid which contains at least one sulfonic group, and $R_3$ represents a radical selected from the group consisting of hydrogen and alkyl, which products are water-soluble powders and valuable dyestuffs.

8. The amidelike derivatives of aminoazo-dyestuffs free from hydroxyl groups, which derivatives correspond to the formula

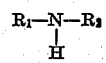

in which $R_1$ represents the radical of an aminoazo-dyestuff which is free from hydroxyl groups and carries at least one amino group united directly to an aromatic nucleus whose ring system consists of not more than 10 carbon atoms, $R_2$ represents an acyl radical which is derived from a halide of a benzoic acid sulfonic acid which contains at least one and not more than two sulfonic groups, which products are dark powders dyeing the fiber yellow to orange and brown tints.

9. The aminelike derivatives of aminoazo-dyestuffs free from hydroxyl groups, which derivatives correspond to the formula

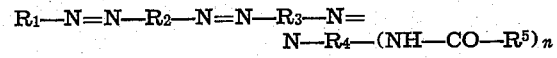

in which $R_1$, $R_2$, $R_3$ and $R_4$ represent aromatic nuclei selected from the group consisting of nuclei of the benzene and of the naphthalene series free from hydroxyl groups whose ring systems consist of not more than 10 carbon atoms, $R_5$ represents a phenyl radical which carries at least one and not more than two sulfonic acid groups, and $n$ represents a whole number not greater than two, which products are dark powders dyeing the vegetable fiber orange to brown tints which are characterized by good fastness to light and dischargeability.

10. The amidelike dyestuff of the formula

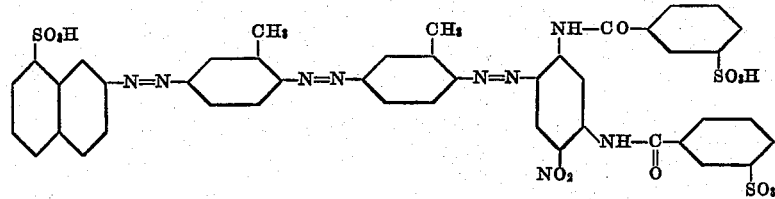

CHARLES GRAENACHER.
JOSEPH GYR.
OTTO KAISER.
FRANZ ACKERMANN.
HEINRICH BRUENGGER.